United States Patent
Sugaya

(10) Patent No.: US 10,472,062 B2
(45) Date of Patent: Nov. 12, 2019

(54) SYSTEM, METHOD, AND PROGRAM FOR CONTROLLING DRONE

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 15/544,614

(22) PCT Filed: Sep. 30, 2016

(86) PCT No.: PCT/JP2016/078995
§ 371 (c)(1),
(2) Date: Jul. 19, 2017

(87) PCT Pub. No.: WO2018/061176
PCT Pub. Date: Apr. 5, 2018

(65) Prior Publication Data
US 2019/0210722 A1 Jul. 11, 2019

(51) Int. Cl.
*B64C 39/02* (2006.01)
*G06K 9/00* (2006.01)
*B64D 47/08* (2006.01)

(52) U.S. Cl.
CPC .......... *B64C 39/024* (2013.01); *B64D 47/08* (2013.01); *G06K 9/0063* (2013.01); *B64C 2201/127* (2013.01)

(58) Field of Classification Search
CPC . B64C 39/024; B64C 2201/117; B64D 47/08; G06K 9/0063
See application file for complete search history.

(56) References Cited

U.S. PATENT DOCUMENTS

| | | | |
|---|---|---|---|
| 9,280,038 B1* | 3/2016 | Pan | G03B 17/561 |
| 9,380,275 B2* | 6/2016 | Davidson, Jr. | H04N 7/183 |
| 2016/0365825 A1* | 12/2016 | Poivet | H02S 20/23 |
| 2017/0169582 A1 | 6/2017 | Tanaka et al. | |
| 2018/0025473 A1* | 1/2018 | Contreras | G05D 1/0033 348/144 |
| 2018/0025649 A1* | 1/2018 | Contreras | G05D 1/0033 701/3 |

FOREIGN PATENT DOCUMENTS

| | | |
|---|---|---|
| JP | 3-292574 | 12/1991 |
| JP | 2005-43324 | 2/2005 |
| JP | 2010-152664 | 7/2010 |

(Continued)

*Primary Examiner* — Russell Frejd
(74) *Attorney, Agent, or Firm* — Lex IP Meister, PLLC

(57) ABSTRACT

The present invention is to provide a system, a method, and a program for controlling a drone to take an image at high resolution if a predetermined condition is satisfied. The system includes an image acquisition unit that acquires an image taken by a drone; an image analysis unit that analyzes the acquired image; an extraction unit that extracts a point that satisfies a predetermined condition based on the result of the image analysis; a position coordinate acquisition unit that acquires the position coordinate of the extracted point; and a control unit that controls the drone to fly to the acquired position coordinate and take an image at a higher resolution than that of the analyzed image.

7 Claims, 4 Drawing Sheets

(56) References Cited

FOREIGN PATENT DOCUMENTS

| | | |
|---|---|---|
| JP | 2011-124965 | 6/2011 |
| JP | 2013-251796 | 12/2013 |
| JP | 2014-62789 | 4/2014 |
| JP | 2014-122019 | 7/2014 |
| WO | 2015/163107 | 10/2015 |
| WO | WO-2016069497 A1 * | 5/2016 ............. G01S 17/88 |

* cited by examiner

<Example of the points where the edge variation is a predetermined value or more>

<Example of the points where image analysis cannot be performed due to low resolution>

SYSTEM, METHOD, AND PROGRAM FOR CONTROLLING DRONE

TECHNICAL FIELD

The present invention relates to a system, a method, and a program for controlling a drone that takes an image with a camera.

BACKGROUND ART

Recently, drones have been widely used, for example, taking images from the sky. The images are analyzed and used for measurement, etc. For example, the sensor system of a drone that is provided with a photodetection and ranging system and a camera system to check the diameters of any number of trees in a group is proposed (Patent Document 1).

CITATION LIST

Patent Literature

Patent Document 1; JP 2014-122019A

SUMMARY OF INVENTION

However, the system of Patent Document 1 has a problem in which the resolution of an image to be taken has to be always high to fly with checking the diameters of any number of trees in a group. In other words, such a system only has to provide a resolution to determine the diameters of trees but actually a higher resolution to take an image regardless of the imaging point.

In view of the above-mentioned problems, an objective of the present invention is to provide a system, a method, and a program for controlling a drone to take an image at high resolution if a predetermined condition is satisfied.

The first aspect of the present invention provides a system for controlling a drone, including:

an image acquisition unit that acquires an image taken by a drone;

an image analysis unit that analyzes the acquired image;

an extraction unit that extracts a point that satisfies a predetermined condition based on the result of the image analysis;

a position coordinate acquisition unit that acquires the position coordinate of the extracted point; and a control unit that controls the drone to fly to the acquired position coordinate and take an image at a higher resolution than that of the analyzed image.

According to the first aspect of the present invention, the system acquires an image taken by a drone, analyzes the acquired image, extracts a point that satisfies a predetermined condition based on the result of the image analysis, acquires the position coordinate of the extracted point, and controls the drone to fly to the acquired position coordinate and take an image at a higher resolution than that of the analyzed image.

The first aspect of the present invention is the category of a system, but the categories of a method, a program, etc., have similar functions and effects.

The present invention is capable to take an image with high resolution at a point where a predetermined condition is satisfied, so as to avoid useless data from being generated by imaging an unnecessary part at high resolution.

DESCRIPTION OF EMBODIMENTS

Embodiments of the present invention will be described below with reference to the attached drawings. However, these are illustrative only, and the technological scope of the present invention is not limited thereto.

Figure 1:
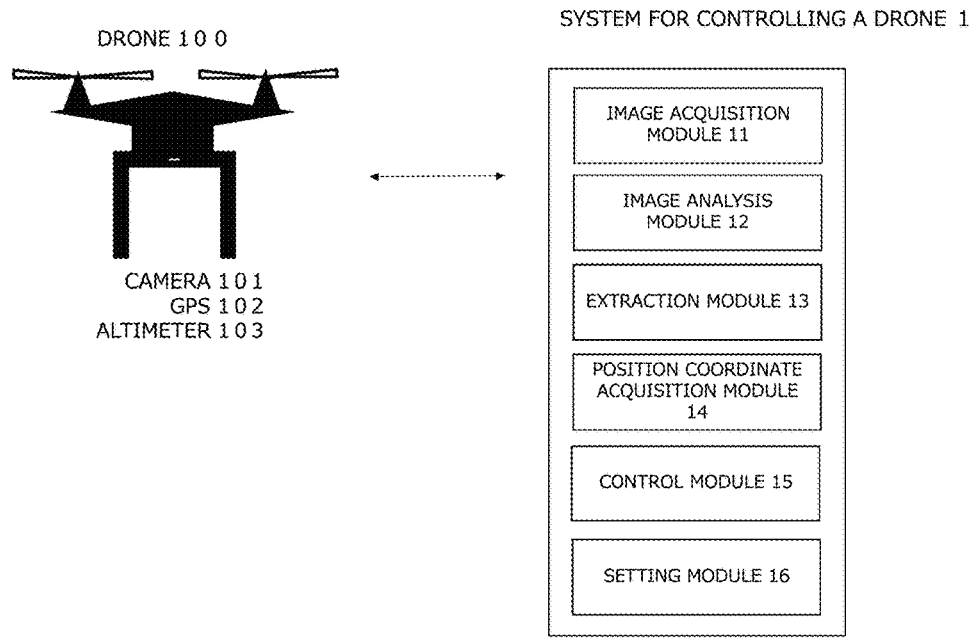
FIG. 1 shows a schematic diagram of the system for controlling a drone.

The system for controlling a drone 1 that is shown in FIG. 1 includes an image acquisition module 11, an image analysis module 12, an extraction module 13, a position coordinate acquisition module 14, a control module 15, and a setting module 16 that the control unit achieves by reading a predetermined program. The drone 100 may be an uninhabited airborne vehicle or a multicopter.

The image acquisition unit 11 acquires the image taken by the camera 101 of a drone 100 connected through a network. The network may be wired or wireless, may be a public line network such as the Internet or a dedicated line network, and may be connected with a cloud or through Peer to Peer (hereinafter referred to as "P2P").

The image analysis module 12 analyzes the acquired image. For example, the image analysis module 12 performs edge detection that is a feature detection. The extraction module 13 extracts a point that satisfies a predetermined condition based on the result of the image analysis. For example, the extraction module 13 extracts a point where the edge variation is a predetermined value or more and a point where the image analysis cannot be performed clue to low resolution.

The position coordinate acquisition module 14 acquires the position coordinate of the extracted point. For example, the drone 100 is provided with a global positioning system (hereinafter referred to as "GPS") 102 to determine the position coordinate of an imaging location. Thus, the position coordinate of the point extracted from the image is also determined. Furthermore, if the drone 100 is provided with an altimeter 103, the altitude is determined.

The control module 15 controls the drone 100 to fly to the position coordinate of the extracted point and take an image at a higher resolution or more than that of the above-mentioned image. To take an image at a higher resolution or more than that of the above-mentioned image, for example, the control module 15 controls the drone 100 to approach or to increase the magnification of the camera 101.

The setting module 16 sets the flight route to fly to all the points if there are two or more points, for example.

The setting module 16 sets the flight route to fly in order of closer position coordinates of the points if there are two or more points, for example. The setting module 16 sets the flight route to fly in order of increasing the edge variations of the points if there are two or more points, for example.

Process Behavior

Figure 2:
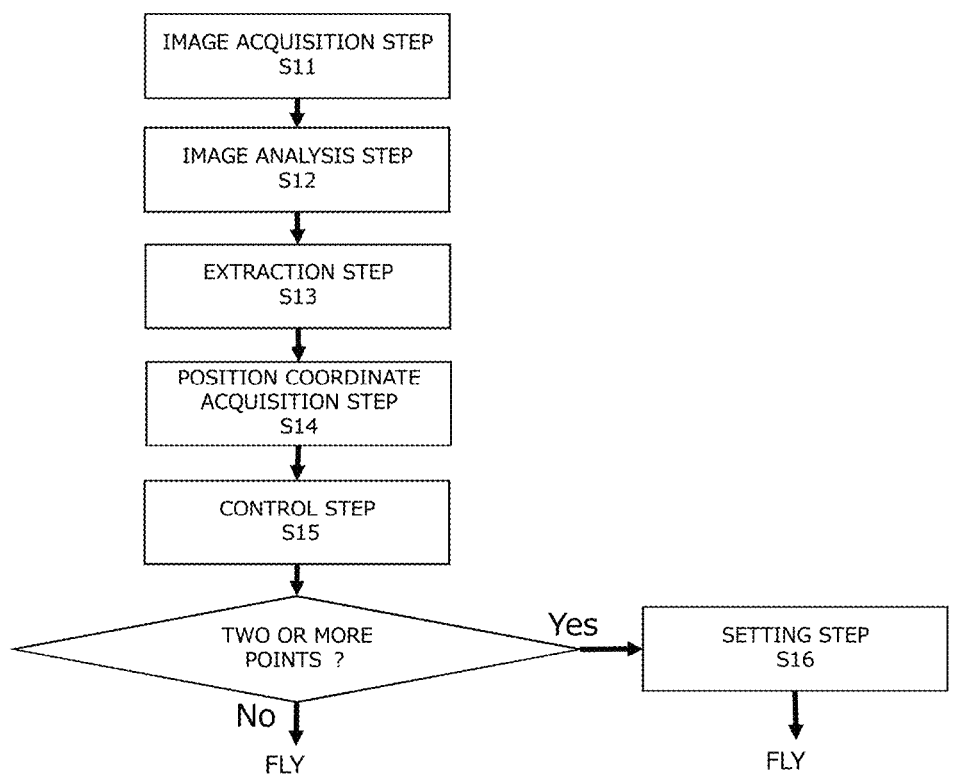
FIG. 2 shows a flow chart of the method for controlling a drone.

The drone control process will be described below with reference to FIG. 2. The image acquisition step S11 acquires the image taken by the camera 101 of a drone 100 connected through a network. The image analysis step S12 analyzes the acquired image. For example, the image analysis step S12 performs edge detection. The edge detection is to detect a discontinuously changed part.

Figure 3:
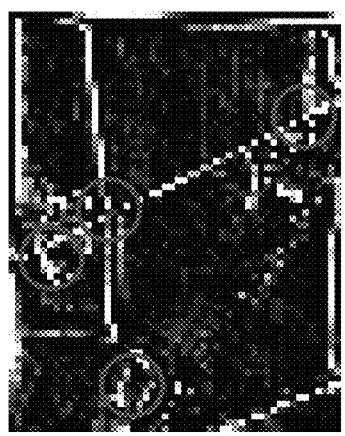
FIG. 3 shows one example illustrating the points where the edge variation is a predetermined value or more.
Figure 4:
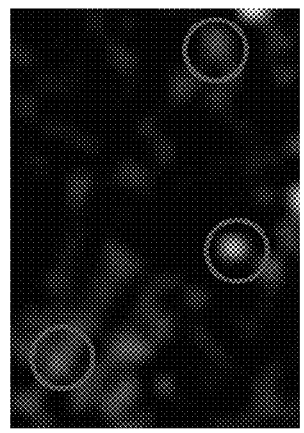
FIG. 4 shows one example illustrating the points where image analysis cannot be performed due to low resolution.

The extraction step S13 extracts a point that satisfies a predetermined condition based on the result of the image analysis. Examples of the point that satisfies a predetermined condition include a point where the edge variation is a predetermined value or more, which is circled in FIG. 3, and a point where the image analysis cannot be performed due to low resolution, which is circled in FIG. 4.

The position coordinate acquisition step S14 acquires the position coordinate of the extracted point. For example, the drone 100 is provided with a GPS 102 to determine the position coordinate of an imaging location, as described above. Thus, the position coordinate of the point extracted from the image is also determined. Furthermore, if the drone 100 is provided with an altimeter 103, the altitude is determined.

The control step S15 controls the drone 100 to fly to the position coordinate of the extracted point and take an image at a higher resolution or more than that of the above-mentioned image. To take an image at a higher resolution or more than that of the above-mentioned image, for example, the control module 15 controls the drone 100 to approach or to increase the magnification of the camera 101.

The setting step S16 sets the flight route to fly all the points based on their respective position coordinates if there are two or more points, for example. The setting step S16 sets the flight route to fly in order of closer position coordinates of the points if there are two or more points, for example. The setting step S16 sets the flight route to fly in order of increasing the edge variations of the points if there are two or more points, for example.

To achieve the means and the functions that are described above, a computer (including a CPU, an information processor, and various terminals) reads and executes a predetermined program. For example, the program may be provided through Software as a Service (SaaS), specifically, from a computer through a network or may be provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

REFERENCE SIGNS LIST

1 System for controlling a drone
11 Image acquisition module
12 Image analysis module
13 Extraction module
14 Position coordinate acquisition module
15 Control module
16 Setting module
100 Drone
101 Camera
102 GPS
103 Altimeter

What is claimed is:

1. A system for controlling a drone, comprising:
an image acquisition unit that acquires an image taken by a drone;
an image analysis unit that analyzes the acquired image;
an extraction unit that extracts at least one first point where the image analysis cannot be performed due to low resolution or at least one second point where an edge variation is a predetermined value or more, based on the result of the image analysis;
a position coordinate acquisition unit that acquires a position coordinate of the extracted first point or second point;
a setting unit that, when the at least one second point includes two or more second points, sets a flight route for the two or more second points of the drone to fly in order of magnitude of the edge variation; and
a control unit that controls the drone to fly to the acquired position coordinate and take an image at a higher resolution than that of the analyzed image.

2. The system according to claim 1, wherein the setting unit, when the at least one first point includes two or more first points, sets a flight route for the two or more first points of the drone to fly to all the first points.

3. The system according to claim 1, wherein the setting unit, when the at least one first point includes two or more first points, sets a flight route for the two or more first points of the drone to fly in order of closer position coordinates of the first points.

4. The system according to claim 1, wherein the control unit controls the drone to approach and take an image at a higher resolution than that of the analyzed image.

5. The system according to claim 1, wherein the control unit controls the drone to increase the magnification of a camera and take an image at a higher resolution than that of the analyzed image.

6. A method for controlling a drone, comprising the steps of:
acquiring an image taken by a drone;
analyzing the acquired image;
extracting at least one first point where the image analysis cannot be performed due to low resolution or at least one second point where an edge variation is a predetermined value or more, based on the result of the image analysis;
acquiring a position coordinate of the extracted first point or second point;
when the at least one second point includes two or more second points, setting a flight route for the two or more second points of the drone to fly in order of magnitude of the edge variation; and
controlling the drone to fly to the acquired position coordinate and take an image at a higher resolution than that of the analyzed image.

7. A computer program product for use in a system for controlling a drone, comprising a non-transitory computer usable medium having a set of instructions physically embodied therein, the set of instructions including computer readable program code, which when executed by the system causes an information processing unit to execute the steps of:
acquiring an image taken by a drone;
analyzing the acquired image;
extracting at least one first point where the image analysis cannot be performed due to low resolution or at least one second point where an edge variation is a predetermined value or more, based on the result of the image analysis;
acquiring a position coordinate of the extracted first point or second point;
when the at least one second point includes two or more second points, setting a flight route for the two or more second points of the drone to fly in order of magnitude of the edge variation; and
controlling the drone to fly to the acquired position coordinate and take an image at a higher resolution than that of the analyzed image.

* * * * *